(12) United States Patent
Panzer et al.

(10) Patent No.: US 11,117,316 B2
(45) Date of Patent: Sep. 14, 2021

(54) CONTINUOUS LIQUID INTERFACE PRODUCTION WITH UPCONVERSION PHOTOPOLYMERIZATION

(71) Applicant: Carbon, Inc., Redwood City, CA (US)

(72) Inventors: Matthew Panzer, Redwood City, CA (US); John R. Tumbleston, Menlo Park, CA (US)

(73) Assignee: Carbon, Inc., Redwood City, CA (US)

(*) Notice: Subject to any disclaimer, the term of this patent is extended or adjusted under 35 U.S.C. 154(b) by 701 days.

(21) Appl. No.: 15/801,883

(22) Filed: Nov. 2, 2017

(65) Prior Publication Data

US 2018/0126630 A1 May 10, 2018

Related U.S. Application Data

(60) Provisional application No. 62/417,758, filed on Nov. 4, 2016.

(51) Int. Cl.
*B33Y 10/00* (2015.01)
*B29C 64/135* (2017.01)
(Continued)

(52) U.S. Cl.
CPC .......... *B29C 64/135* (2017.08); *B29C 64/124* (2017.08); *B29C 64/129* (2017.08);
(Continued)

(58) Field of Classification Search
CPC ... B29C 64/135; B29C 64/124; B29C 64/129; B33Y 10/00
(Continued)

(56) References Cited

U.S. PATENT DOCUMENTS 5,236,326 A 8/1993 Grossa
5,573,889 A * 11/1996 Hofmann .............. G03F 7/0037
430/285.1
(Continued)

FOREIGN PATENT DOCUMENTS

WO WO 2014/126830 A2 8/2014
WO WO 2014/126837 A2 8/2014
WO WO 2017/059082 A1 4/2017

OTHER PUBLICATIONS

International Search Report and Written Opinion, PCT/US2016/054467, dated Dec. 23, 2016.
(Continued)

*Primary Examiner* — Jeffrey M Wollschlager
*Assistant Examiner* — Xue H Liu
(74) *Attorney, Agent, or Firm* — Myers Bigel, P.A.

(57) ABSTRACT

A method of forming a three-dimensional object can be carried out by: (a) providing a carrier and an optically transparent member having a build surface, the carrier and the build surface defining a build region therebetween; (b) filling the build region with a polymerizable liquid, the polymerizable liquid comprising: (i) a polymerizable component; (ii) upconverting particles that are excited by light at a first wavelength and upon excitation emit light at a second wavelength that is shorter than the first wavelength; and (iii) a photoiniator that catalyzes polymerization of the polymerizable component upon excitation by light at the second wavelength; (c) irradiating the build region through the optically transparent member with an excitation light at the first wavelength, and optionally but in some embodiments preferably also advancing the carrier away from the build surface, wherein the excitation light is temporally and/or spatially modulated, to thereby form the three-dimensional object from the polymerizable liquid.

34 Claims, 6 Drawing Sheets

(51) Int. Cl.
- *B29C 64/277* (2017.01)
- *B33Y 70/00* (2020.01)
- *B29C 64/129* (2017.01)
- *B29C 64/124* (2017.01)
- *B29K 105/00* (2006.01)

(52) U.S. Cl.
CPC ............ *B29C 64/277* (2017.08); *B33Y 10/00* (2014.12); *B33Y 70/00* (2014.12); *B29K 2105/0094* (2013.01); *B29K 2995/0021* (2013.01)

(58) Field of Classification Search
USPC .......................................................... 264/401
See application file for complete search history.

(56) References Cited

U.S. PATENT DOCUMENTS

| | | | |
|---|---|---|---|
| 6,259,450 | B1 | 7/2001 | Chiabrera et al. |
| 6,304,263 | B1 | 10/2001 | Chiabrera et al. |
| 2011/0089610 | A1* | 4/2011 | El-Siblani ............. B33Y 70/00 264/401 |
| 2015/0182321 | A1* | 7/2015 | Karazivan ................ A61K 6/70 433/3 |
| 2015/0185617 | A1 | 7/2015 | Markle et al. |
| 2016/0067921 | A1 | 3/2016 | Willis et al. |
| 2016/0107380 | A1 | 4/2016 | Smoot et al. |
| 2018/0290374 | A1 | 10/2018 | Willis et al. |

OTHER PUBLICATIONS

Mendez-Ramos J et al. Infrared-light induced curing of photosensitive resins through photon up-conversion for novel cost-effective luminescent 3D-printing technology. J. Mater. Chem. C. 2016; 4: 801-806.

Ruiz-Morales JC et al. Novel up-conversion luminescent rare-earth-doped organic resins for cost-effective applications in 3D photonic devices. J. Mater. Chem. C. 2014; 2: 2944-2948.

Tumbleston, JR et al. Continuous liquid interface production of 3D objects. Science. Mar. 20, 2015; 347(6288): 1349-1352.

* cited by examiner

CONTINUOUS LIQUID INTERFACE PRODUCTION WITH UPCONVERSION PHOTOPOLYMERIZATION

RELATED APPLICATION

This application claims priority to U.S. Provisional Patent No. 62/417,758, filed Nov. 4, 2017, the disclosure of which is hereby incorporated by reference in its entirety.

FIELD OF THE INVENTION

The present invention concerns materials, methods and apparatus for the fabrication of solid three-dimensional objects from liquid materials, and objects so produced.

BACKGROUND OF THE INVENTION

In conventional additive or three-dimensional fabrication techniques, construction of a three-dimensional object is performed in a step-wise or layer-by-layer manner. In particular, layer formation is performed through solidification of photo curable resin under the action of visible or UV light irradiation. Two techniques are known: one in which new layers are formed at the top surface of the growing object; the other in which new layers are formed at the bottom surface of the growing object.

If new layers are formed at the top surface of the growing object, then after each irradiation step the object under construction is lowered into the resin "pool," a new layer of resin is coated on top, and a new irradiation step takes place. An early example of such a technique is given in Hull, U.S. Pat. No. 5,236,637, at FIG. 3. A disadvantage of such "top down" techniques is the need to submerge the growing object in a (potentially deep) pool of liquid resin and reconstitute a precise overlayer of liquid resin.

If new layers are formed at the bottom of the growing object, then after each irradiation step the object under construction must be separated from the bottom plate in the fabrication well. An early example of such a technique is given in Hull, U.S. Pat. No. 5,236,637, at FIG. 4. While such "bottom up" techniques hold the potential to eliminate the need for a deep well in which the object is submerged by instead lifting the object out of a relatively shallow well or pool, a problem with such "bottom up" fabrication techniques, as commercially implemented, is that extreme care must be taken, and additional mechanical elements employed, when separating the solidified layer from the bottom plate due to physical and chemical interactions therebetween. For example, in U.S. Pat. No. 7,438,846, an elastic separation layer is used to achieve "non-destructive" separation of solidified material at the bottom construction plane. Other approaches, such as the B9Creator™ 3-dimensional printer marketed by B9Creations of Deadwood, S.D., USA, employ a sliding build plate. See, e.g., M. Joyce, US Patent App. 2013/0292862 and Y. Chen et al., US Patent App. 2013/0295212 (both Nov. 7, 2013); see also Y. Pan et al., *J. Manufacturing Sci. and Eng.* 134, 051011-1 (October 2012). Such approaches introduce a mechanical step that may complicate the apparatus, slow the method, and/or potentially distort the end product.

In J. DeSimone et al., Continuous Liquid Interphase Printing, PCT Application WO2014/1268372 (published Aug. 21, 2014) a method for additive manufacturing from a window is described in which adhesion to the window is inhibited by allowing an inhibitor of polymerization, such as oxygen, to pass through the window, forming a non-polymerized release layer or "dead zone" that forms a "liquid interface" with the growing three-dimensional object, in turn enabling continuous or layerless production of the three-dimensional object from that interface (see also J. Tumbleston et al., Continuous liquid interface production of 3D Objects, *Science* 347, 1349-1352 (published online 16 Mar. 2015)). This approach utilizes a window that is permeable to the inhibitor of polymerization, which in some embodiments may require the construction of a complicated or expensive window. See, e.g., J. DeSimone et al., Three-Dimensional Printing with Build Plates having a Smooth or Patterned Surface and Related Methods, PCT Application WO 2016/025579 (published Feb. 18, 2016). Other approaches for potentially obviating the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016). All pose difficulties for implementation in at least some circumstances, and additional alternatives are desirable.

Continuous processes for producing a three-dimensional object are suggested at some length with respect to "top down" techniques in U.S. Pat. No. 7,892,474, but this reference does not explain how they may be implemented in "bottom up" systems in a manner non-destructive to the article being produced, which limits the materials which can be used in the process, and in turn limits the structural properties of the objects so produced.

SUMMARY

A method of forming a three-dimensional object can be carried out by: (a) providing a carrier and an optically transparent member having a build surface, the carrier and the build surface defining a build region therebetween; (b) filling the build region with a polymerizable liquid, the polymerizable liquid comprising: (i) a polymerizable component; (ii) upconverting particles that are excited by light at a first wavelength and upon excitation emit light at a second wavelength that is shorter than the first wavelength; and (iii) a photoiniator that catalyzes polymerization of the polymerizable component upon excitation by light at the second wavelength; (c) irradiating the build region through the optically transparent member with an excitation light at the first wavelength, and optionally but in some embodiments preferably also advancing the carrier away from the build surface, wherein the excitation light is temporally and/or spatially modulated, to thereby form the three-dimensional object from the polymerizable liquid.

In some embodiments, the optically transparent member is impermeable to an inhibitor of polymerization.

In some embodiments, wherein the optically transparent member is permeable to an inhibitor of polymerization, and the method further comprises feeding an inhibitor of polymerization through the optically transparent member.

In some embodiments of the foregoing, the irradiating and/or the advancing steps are carried out while also concurrently: (i) continuously maintaining a dead zone of polymerizable liquid in contact with the build surface, and (ii) continuously maintaining a gradient of polymerization zone or active surface between the dead zone and the solidified polymer and in contact with each thereof, the gradient of polymerization zone or active surface comprising the polymerizable liquid in partially cured form.

In some embodiments, the dead zone is maintained by (a) focus of the excitation in the polymerizable liquid above the dead zone, (b) feeding of the inhibitor of polymerization through the optically transparent member, or (c) a combination thereof.

In some embodiments, the irradiating with an excitation light is carried out continuously, intermittently, or a combination thereof.

In some embodiments, the advancing is carried out continuously, intermittently, reciprocally, or a combination thereof.

In some embodiments, wherein the spatially modulated is created by a liquid crystal display (LCD) or a digital micromirror display (DMD).

In some embodiments, the first wavelength is in the infrared or near-infrared range, and the second wavelength is in the ultraviolet range.

In some embodiments, the first wavelength is in the range of 400 nm or 700 nm, up to 1100 or 1200 nm.

In some embodiments of the foregoing, the second wavelength is in the range of 200 or 250 nm, up to 400 or 500 nm.

In some embodiments of the foregoing, the polymerizable liquid has an extinction coefficient at the first wavelength of 0.01, 0.005, or 0.0001 $um^{-1}$ or less.

In some embodiments of the foregoing, wherein the polymerizable liquid has a total extinction (scatter plus absorption) at the second wavelength of (i) not more than 0.1, or 0.01 $um^{-1}$, or (ii) at least 0.1, 1, or 5 $um^{-1}$.

In some embodiments of the foregoing, the polymerizable liquid has a viscosity of 1,000 centipoise, 2,000 centipoise, or 4,000 centipoise, or more, under the conditions in which the method is carried out.

Also described herein is a method of forming a three-dimensional object which may be carried out by: (a) providing a carrier and an optically transparent member having a build surface, the carrier and the build surface defining a build region therebetween; (b) filling the build region with a polymerizable liquid, the polymerizable liquid comprising: (i) a polymerizable component; (ii) upconverting particles that are excited by light at a first wavelength and upon excitation emit light at a second wavelength that is shorter than the first wavelength; and (iii) a photoiniator that catalyzes polymerization of the polymerizable component upon excitation by light at the second wavelength; (c) irradiating the build region with light through the optically transparent member, and optionally but in some embodiments preferably also advancing the carrier away from the build surface, wherein the irradiating is carried out with both: (i) an excitation light at the first wavelength, and (ii) a depletion light at a third wavelength, different from the first and second wavelengths, that inhibits the excitation of the upconverting particles; and wherein at least one of the excitation and depletion lights is temporally and/or spatially modulated to thereby form the three-dimensional object.

In some embodiments of the foregoing, the excitation light is both spatially and temporally modulated, and the depletion light is: (i) uniform flood exposure over time, (ii) uniform flood exposure modulated in intensity over time; (iii) uniform intensity exposure spatially modulated over time; or (iv) spatially and temporally modulated over time.

In some embodiments of the foregoing, the excitation light is (i) uniform flood exposure over time or (ii) uniform flood exposure modulated in intensity over time, and the depletion light is both spatially and temporally modulated.

In some embodiments of the foregoing, the optically transparent member is impermeable to an inhibitor of polymerization.

In some embodiments of the foregoing, the optically transparent member is permeable to an inhibitor of polymerization, and the method further comprises feeding an inhibitor of polymerization through the optically transparent member.

In some embodiments of the foregoing, the irradiating and/or the advancing steps are carried out while also concurrently: (i) continuously maintaining a dead zone of polymerizable liquid in contact with the build surface, and (ii) continuously maintaining a gradient of polymerization zone or active surface between the dead zone and the solidified polymer and in contact with each thereof, the gradient of polymerization zone or active surface comprising the polymerizable liquid in partially cured form.

In some embodiments of the foregoing, the dead zone is maintained by (a) exposure of the polymerizable liquid to the second light, (b) feeding of the inhibitor of polymerization through the optically transparent member, or (c) a combination thereof.

In some embodiments of the foregoing, the irradiating with an excitation light is carried out continuously, intermittently, or a combination thereof.

In some embodiments of the foregoing, the irradiating with a depletion light is carried out continuously, intermittently, or a combination thereof.

In some embodiments of the foregoing, the advancing is carried out continuously, intermittently, reciprocally, or a combination thereof.

In some embodiments of the foregoing, wherein the patterned exposure is created by a liquid crystal display (LCD) or a a digital micromirror display (DMD).

In some embodiments of the foregoing, the first wavelength is in the infrared or near-infrared range, and the second wavelength is in the ultraviolet range.

In some embodiments of the foregoing, the first wavelength is in the range of 400 nm or 700 nm, up to 1100 or 1200 nm.

In some embodiments of the foregoing, the second wavelength is in the range of 200 or 250 nm, up to 400 or 500 nm.

In some embodiments of the foregoing, the third wavelength is in the range of 400 or 800 nm, up to 1300 or 1600 nm.

In some embodiments of the foregoing: (i) the first wavelength in the range of 800 to 1000 nm, the second wavelength in the range of 300 to 400 nm, and the third wavelength is in the range of 400 to 800 nm; (ii) the first wavelength in the range of 800 to 1000 nm, the second wavelength in the range of 300 to 400 nm, and the third wavelength is in the range of 1100 to 1600 nm; (iii) the first wavelength in the range of 900 to 1000 nm, the second wavelength in the range of 300 to 400 nm, and the third wavelength is in the range of 400 to 900 nm; (iv) the first wavelength in the range of 800 to 1000 nm, the second wavelength in the range of 250 to 300 nm, and the third wavelength is in the range of 400 to −800 nm; or (v) the first wavelength in the range of 800 to 1000 nm, the second wavelength in the range of 250 to 475 nm, and the third wavelength is in the range of 475 to 800 nm.

In some embodiments of the foregoing, the polymerizable liquid has an extinction coefficient at the first wavelength of 0.01, 0.005, or 0.0001 $um^{-1}$ or less.

In some embodiments of the foregoing, the polymerizable liquid has a total extinction (scatter plus absorption) at the second wavelength of (i) not more than 0.1, or 0.01 um$^{-1}$, or (ii) at least 0.1, 1, or 5 um$^{-1}$.

In some embodiments of the foregoing, the polymerizable liquid has a viscosity of 1,000 centipoise, 2,000 centipoise, or 4,000 centipoise, or more, under the conditions in which the method is carried out.

J. Mendez-Ramos, J. C. Ruiz-Morales, et al., *Infrared-light induced curing of photosensitive resins through photon up-conversion for novel cost-effective luminescent 3D-printing technology*, J. Mater. Chem. C 4, 801, 804-805 (2016), describe up-converting particles for desktop stereolithography, but by attaching a single particle or crystal attached to an optical fiber, producing UV-blue light by up-conversion to perform quasi-instantaneous "laser writing." (see also J. C. Ruiz-Morales, J. Mendez-Ramos, et al., *Novel up-conversion luminescent rare-earth-doped organic resins for cost-effective applications in 3D photonic devices*, J. Mater Chem. C. (2014)).

The present invention is explained in greater detail in the drawings herein and the specification set forth below.

BRIEF DESCRIPTION OF THE DRAWINGS

In FIGS. 7A, 8A, 9A, and 10A, vertical stripes identify pixels delivering excitation wavelength exposure; bold diagonal stripes identify pixels delivering high intensity depletion wavelength exposure; and light diagonal stripes identify pixels delivering low intensity depletion wavelength exposure. In FIGS. 7B, 8B, 9B, and 10B, white squares identify regions, corresponding to pixels, in segment of the produced part corresponding to the slice of pixels on the left that are not polymerized, and black squares identify regions that are polymerized.

FIG. 8A-8B schematically illustrates a first example embodiment of a dual wavelength exposure pattern of the present invention, in which intensity of the depletion light is uniformly delivered.

FIG. 9A-9B schematically illustrates a second example embodiment of a dual wavelength exposure pattern of the present invention, in which intensity of the depletion light is non-uniformly delivered, in a concentric pattern.

FIG. 10A-10B schematically illustrates a second example embodiment of a dual wavelength exposure pattern of the present invention, in which intensity of the depletion light is non-uniformly delivered, in an offset pattern.

DETAILED DESCRIPTION OF ILLUSTRATIVE EMBODIMENTS

Figure 1:
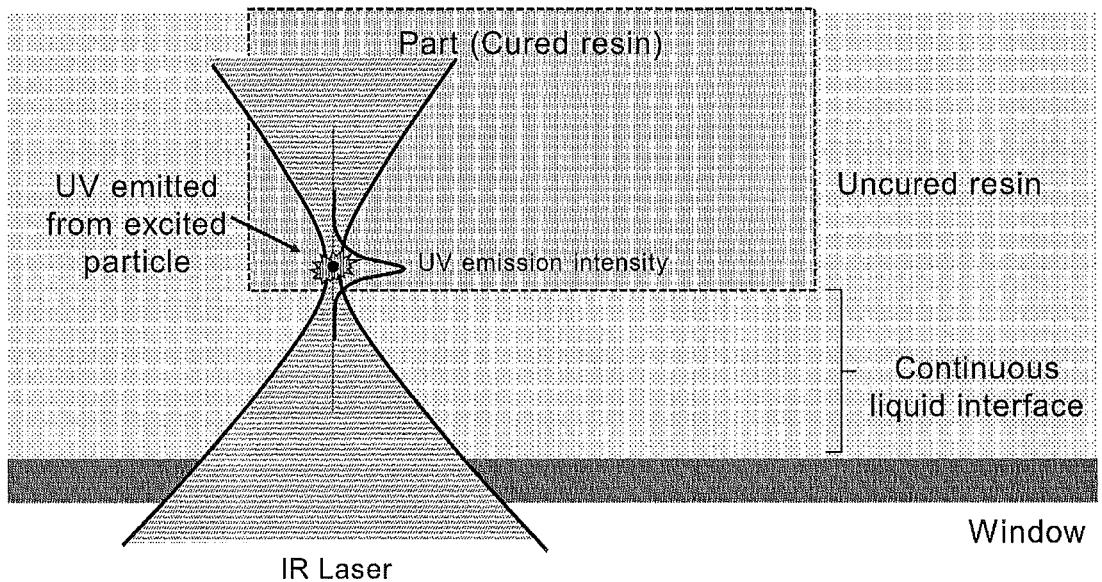
FIG. 1 illustrates a first embodiment of a method of making a three-dimensional object employing upconversion particles to maintain a continuous liquid interface.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components nents and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

I. Polymerizable Liquids.

Dual cure systems as described herein may include a first curable system (sometimes referred to as "Part A" or herein) that is curable by actinic radiation, typically light, and in some embodiments ultraviolet (UV) light). Any suitable polymerizable liquid can be used as the first component. The liquid (sometimes also referred to as "liquid resin" "ink," or simply "resin" herein) can include a monomer, particularly photopolymerizable and/or free radical polymerizable monomers, and a suitable initiator such as a free radical initiator, and combinations thereof. Examples include, but are not limited to, acrylics, methacrylics, acrylamides, styrenics, olefins, halogenated olefins, cyclic alkenes, maleic anhydride, alkenes, alkynes, carbon monoxide, functionalized oligomers, multifunctional cute site monomers, functionalized PEGs, etc., including combinations thereof. Examples of liquid resins, monomers and initiators include but are not limited to those set forth in U.S. Pat. Nos. 8,232,043; 8,119,214; 7,935,476; 7,767,728; 7,649,029; WO 2012129968 A1; CN 102715751 A; JP 2012210408 A.

Up-converting particles. Resins of the present invention include up-converting particles. Up-converting particles (e.g., luminescent particles or luminescent crystals) are known. See, e.g., G. Wang et al., *Intense ultraviolet upconversion luminescence from hexagonal NaYF$_4$:Yb$^{3+}$Tm$^{3+}$ microcrystals*, Optics Express 14 (14 Aug. 2008). Examples include but are not limited to those described in, Ostler & Lu, U.S. Pat. No. 8,944,820, the disclosure of which is incorporated herein by reference. In some embodiments, the particles emit radiation at a wavelength in the visible or ultraviolet spectrum when irradiated with a radiation having a longer wavelength, and more particularly when irradiated with visible, near-infrared or infrared radiation. For example, the particles may emit radiation at a wavelength in the range of 200 or 250 nm, up to 400 or 500 nm, when excited with radiation at a wavelength in the range of 400 nm or 700 nm, up to 1100 or 1200 nm. The particles and the photoinitiators are, in general, selected so that the emission wavelength of the particles activates the photoinitiator (i.e. the particles emit at or near the peak absorption wavelength of the photoinitiator).

Examples of up-converting particles that may be used in carrying out the present invention include those that employ lanthanide fluorides, lanthanide fluoride salts, or lanthanide oxide hosts, such as yttrium oxide salts, yttrium fluoride salts (such as sodium yttrium fluoride (NaYF$^4$), ytterbium fluoride salts (such as Na(YbF)$_4$) and/or lutetium oxide (Lu$_2$O$_3$)), that are doped or co-doped with one or more lanthanide series ions, such as ytterbium (Yb$^{3+}$), lutetium (Lu$^{3+}$), thulium (Tm$^{3+}$), terbium (Tb$^{3+}$), erbium (Er$^{3+}$), and praseodymium (Pr$^{3+}$). Yttrium oxide and yttrium fluoride salt hosts may also be used, although lanthanide based hosts are preferred because of the lanthanide's contribution to the luminescent up-conversion. The particles have, in some embodiments, an average particle size between 1, 10 or 100 nanometers, up to 100 or 200 micrometers, or more, although still larger, or smaller, particles can also be used. The particles may have any suitable shape or structure, including but not limited to be spherical, rod-like, cylindrical, cubic, disk, hexagonal, and combinations thereof. See, e.g., U.S. Pat. No. 8,944,820.

In some embodiments, the particles are sodium yttrium fluoride, co-doped with thulium and ytterbium, such as American Elements Product Code NAYF-YBTM-01 (American Elements, 1093 Broxton Ave., Suite 2000, Los Angeles, Calif. 90024 USA) and Sigma-Aldrich Product Code 756563 Aldrich (Sigma-Aldrich Customer Service, PO Box 14508, St. Louis, Mo. 63178 USA).

Acid catalyzed polymerizable liquids. While in some embodiments as noted above the polymerizable liquid comprises a free radical polymerizable liquid (in which case an inhibitor may be oxygen as described below), in other embodiments the polymerizable liquid comprises an acid catalyzed, or cationically polymerized, polymerizable liquid. In such embodiments the polymerizable liquid comprises monomers contain groups suitable for acid catalysis, such as epoxide groups, vinyl ether groups, etc. Thus suitable monomers include olefins such as methoxyethene, 4-methoxystyrene, styrene, 2-methylprop-1-ene, 1,3-butadiene, etc.; heterocycloic monomers (including lactones, lactams, and cyclic amines) such as oxirane, thietane, tetrahydrofuran, oxazoline, 1,3, dioxepane, oxetan-2-one, etc., and combinations thereof. A suitable (generally ionic or non-ionic) photoacid generator (PAG) is included in the acid catalyzed polymerizable liquid, examples of which include, but are not limited to onium salts, sulfonium and iodonium salts, etc., such as diphenyl iodide hexafluorophosphate, diphenyl iodide hexafluoroarsenate, diphenyl iodide hexafluoroantimonate, diphenyl p-methoxyphenyl triflate, diphenyl p-toluenyl triflate, diphenyl p-isobutylphenyl triflate, diphenyl p-tert-butylphenyl triflate, triphenylsulfonium hexafluororphosphate, triphenylsulfonium hexafluoroarsenate, triphenylsulfonium hexafluoroantimonate, triphenylsulfonium triflate, dibutylnaphthylsulfonium triflate, etc., including mixtures thereof. See, e.g., U.S. Pat. Nos. 7,824,839; 7,550,246; 7,534,844; 6,692,891; 5,374,500; and 5,017,461; see also *Photoacid Generator Selection Guide for the electronics industry and energy curable coatings* (BASF 2010).

Hydrogels. In some embodiments suitable resins includes photocurable hydrogels like poly(ethylene glycols) (PEG) and gelatins. PEG hydrogels have been used to deliver a variety of biologicals, including Growth factors; however, a great challenge facing PEG hydrogels crosslinked by chain growth polymerizations is the potential for irreversible protein damage. Conditions to maximize release of the biologicals from photopolymerized PEG diacrylate hydrogels can be enhanced by inclusion of affinity binding peptide sequences in the monomer resin solutions, prior to photopolymerization allowing sustained delivery. Gelatin is a biopolymer frequently used in food, cosmetic, pharmaceutical and photographic industries. It is obtained by thermal denaturation or chemical and physical degradation of collagen. There are three kinds of gelatin, including those found in animals, fish and humans. Gelatin from the skin of cold water fish is considered safe to use in pharmaceutical applications. UV or visible light can be used to crosslink appropriately modified gelatin. Methods for crosslinking gelatin include cure derivatives from dyes such as Rose Bengal.

Photocurable silicone resins. A suitable resin includes photocurable silicones. UV cure silicone rubber, such as Siliopren™ UV Cure Silicone Rubber can be used as can LOCTITE™ Cure Silicone adhesives sealants. Applications include optical instruments, medical and surgical equipment, exterior lighting and enclosures, electrical connectors/sensors, fiber optics and gaskets.

Biodegradable resins. Biodegradable resins are particularly important for implantable devices to deliver drugs or for temporary performance applications, like biodegradable screws and stents (U.S. Pat. Nos. 7,919,162; 6,932,930). Biodegradable copolymers of lactic acid and glycolic acid (PLGA) can be dissolved in PEG dimethacrylate to yield a transparent resin suitable for use. Polycaprolactone and PLGA oligomers can be functionalized with acrylic or methacrylic groups to allow them to be effective resins for use.

Photocurable polyurethanes. A particularly useful resin is photocurable polyurethanes (including, polyureas, and copolymers of polyurethanes and polyureas (e.g., poly(urethane-urea)). A photopolymerizable polyurethane/polyurea composition comprising (1) a polyurethane based on an aliphatic diisocyanate, poly(hexamethylene isophthalate glycol) and, optionally, 1,4-butanediol; (2) a polyfunctional acrylic ester; (3) a photoinitiator; and (4) an anti-oxidant, can be formulated so that it provides a hard, abrasion-resistant, and stain-resistant material (U.S. Pat. No. 4,337,130). Photocurable thermoplastic polyurethane elastomers incorporate photoreactive diacetylene diols as chain extenders.

High performance resins. In some embodiments, high performance resins are used. Such high performance resins may sometimes require the use of heating to melt and/or reduce the viscosity thereof, as noted above and discussed further below. Examples of such resins include, but are not limited to, resins for those materials sometimes referred to as liquid crystalline polymers of esters, ester-imide, and ester-amide oligomers, as described in U.S. Pat. Nos. 7,507,784; 6,939,940. Since such resins are sometimes employed as high-temperature thermoset resins, in the present invention they further comprise a suitable photoinitiator such as benzophenone, anthraquinone, or fluoroenone initiators (including derivatives thereof), to initiate cross-linking on irradiation, as discussed further below.

Dual cure resins. In addition to a light-polymerizable, or first polymerizable, component (sometimes referred to as the "part A" component as noted above), the resin may contain one or more additional constituents (sometimes referred to as "part B" constituents) that are cured or polymerized by a different mechanism, concurrently with or subsequent to the formation of the three-dimensional object. Examples of such dual cure resins and their components include those described in, for example, U.S. Pat. No. 9,453,142 to Rolland et al., and In US Patent Application Publication Nos. 2016/0136889 and 2016/0137838, both to Rolland et al., the disclosures of all of which are incorporated by reference herein in their entirety.

Additional resin ingredients. The liquid resin or polymerizable material can have solid particles suspended or dispersed therein. Any suitable solid particle can be used, depending upon the end product being fabricated. The particles can be metallic, organic/polymeric, inorganic, or composites or mixtures thereof. The particles can be non-conductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 um average diameter).

The particles can comprise an active agent or detectable compound as described below, though these may also be provided dissolved solubilized in the liquid resin as also discussed below. For example, magnetic or paramagnetic particles or nanoparticles can be employed.

The liquid resin can have additional ingredients solubilized therein, including pigments, dyes, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Inhibitors of polymerization. Inhibitors or polymerization inhibitors for use in the present invention may be in the form of a liquid or a gas. In some embodiments, gas inhibitors are preferred. The specific inhibitor will depend upon the monomer being polymerized and the polymerization reaction. For free radical polymerization monomers, the inhibitor can conveniently be oxygen, which can be provided in the form of a gas such as air, a gas enriched in oxygen (optionally but in some embodiments preferably containing additional inert gases to reduce combustibility thereof), or in some embodiments pure oxygen gas. In alternate embodiments, such as where the monomer is polymerized by photoacid generator initiator, the inhibitor can be a base such as ammonia, trace amines (e.g. methyl amine, ethyl amine, di and trialkyl amines such as dimethyl amine, diethyl amine, trimethyl amine, triethyl amine, etc.), or carbon dioxide, including mixtures or combinations thereof.

Polymerizable liquids carrying live cells. In some embodiments, the polymerizable liquid may carry live cells as "particles" therein. Such polymerizable liquids are generally aqueous, and may be oxygenated, and may be considered as "emulsions" where the live cells are the discrete phase. Suitable live cells may be plant cells (e.g., monocot, dicot), animal cells (e.g., mammalian, avian, amphibian, reptile cells), microbial cells (e.g., prokaryote, eukaryote, protozoal, etc.), etc. The cells may be of differentiated cells from or corresponding to any type of tissue (e.g., blood, cartilage, bone, muscle, endocrine gland, exocrine gland, epithelial, endothelial, etc.), or may be undifferentiated cells such as stem cells or progenitor cells. In such embodiments the polymerizable liquid can be one that forms a hydrogel, including but not limited to those described in U.S. Pat. Nos. 7,651,683; 7,651,682; 7,556,490; 6,602,975; 5,836,313; etc.

Colorants: Pigments or dyes. In some preferred embodiments, polymerizable liquids used in the present invention include colorants, such as one or more non-reactive pigments or dyes. In general, colorants are included in the polymerizable liquid in amounts of from 0.05 or 0.1 percent by weight, up to 5 or 10 percent by weight. Examples include, but are not limited to, (i) titanium dioxide (e.g., in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, hydroxypenyltriazine, and/or benzotriazole ultraviolet light absorber (e.g. in an amount of 0.001 or 0.005 to 1, 2 or 4 percent by weight). Colorants may be selected to impart any (typically) visually opaque (as opposed to visually transparent or translucent) color or appearance to the three-dimensional object, including black, white, and red, orange, yellow, green, blue, or violet (these terms including variants thereof of different colorfulness, chroma, saturation, lightness, and/or brightness, such as grey).

In some embodiments, colorants that are visually opaque, but transparent to infrared radiation, are preferred. See, e.g., U.S. Pat. No. 5,160,171; see also S. Yamamiya et al., Using infrared-transparent pigments to identify objections, *Systems and Computers in Japan* 33, 74-82 (2002); K. Sato et al., Laser welding of plastics transparent to near-infrared radiation, *Proc. SPIE* 4637, *Photon Processing in Microelectronics and Photonics* 528 (Jun. 17, 2002).

The choice of colorant may influence properties of resin and hence the performance of the resin in the methods described herein. Hence, colorants and their amounts are preferably chosen to achieve the following resin properties, for the following reasons:

For the purpose of facilitating spatially selective excitation the upconverting particles at a location that maintains the continuous liquid interface during the process, the extinction coefficient of the polymerizable liquid (based on the contributions of all constituents including colorants) at the first wavelength is preferably low. For example, an extinction coefficient for the polymerizable liquid at the first wavelength of 0.01, 0.005, or 0.0001 $um^{-1}$ or less, is preferred (which would give a penetration depth of about 100 um, 500 um, or 1000 um, or more). This will generally result in a penetration depth for the first wavelength light (e.g., infrared or near-infrared) being greater than the penetration depth of the second wavelength (e.g., ultraviolet) light during the process.

In general, the lesser the total extinction of the polymerizable liquid at the second wavelength, the larger or coarser the resolution of the object being produced (in the x,y, and z dimensions) can be (resolution also depending in part on the optical system being used). Thus, for example, in cases where resolution can be large or coarse, the total extinction (scatter plus absorption) of the polymerizable liquid at the second wavelength is preferably less than 0.1 or 0.01 $um^{-1}$. Conversely, in cases where resolution should be small or fine, the total extinction of the polymerizable liquid at the second wavelength is preferably at least 0.1, 1, or 5 or $um^{-1}$.

II. Methods and Apparatus.

Some elements, steps and features that may be used in carrying out the present invention are explained in PCT Applications Nos. PCT/US2014/015486 (also published as US 2015/0102532); PCT/US2014/015506 (also published as US 2015/0097315), PCT/US2014/015497 (also published as US 2015/0097316), and in J. Tumbleston, et al., Continuous liquid interface production of 3D Objects, *Science* 347, 1349-1352 (published online 16 Mar. 2015).

Additional elements, steps and features that may be used in carrying out the present invention are explained in US Patent Application Publication No. US 2004/0181313 to Shih et al., in U.S. Pat. No. 8,697,346 to McLeod et al., S. Hell et al., Nanoscale Resolution with Focused Light: STED and Other RESOLFT Microscopy Concepts, in *Handbook of Biological Confocal Microscopy* (J. Pawley ed., 3d Ed. 2006); T. Andrew et al., Confining Light to Deep Subwavelength Dimensions to Enable Optical Nanopatterning, *Science*, 324, 917-921 (2009); and T. Scott et al., Two-color Single-Photon Photoinitiation and Photoinhibition for sub-diffraction Photolithography, *Science* 324, 913-917 (2009).

In the methods described herein, a liquid interface is continuously maintained between the "window" or build surface, and the growing three-dimensional object, and in contact with each thereof, during fabrication of most or all of the three-dimensional object. The carrier may be advanced away from the build surface in any suitable manner, including (i) continuously and unidirectionally, (ii) in a step-wise fashion, (iii) in a reciprocating fashion to facilitate flow of polymerizable liquid into the build region, and (iv) combinations of the foregoing.

FIG. 1 illustrates a first embodiment of a method of producing a three dimensional object, while maintaining a continuous liquid interface, the method utilizing upconversion particles (as described above) in the resin. In this embodiment, resin is held in a container above an optically transparent, gas impermeable (and specifically oxgen impermeable), window (e.g., glass or sapphire). The resin is irradiated with infrared light focused with a high numerical aperture to generate a high intensity focal spot with short depth of focus at a location away from the window in the resin (e.g., 10 or 20 to 100 or 200 or 1000 to 10000 um above the window). The cure rate of the resin is only appreciable near the focal spot, so curing occurs only near the focal spot and an uncured, liquid, resin layer is continuously maintained near the window, while the part is continuously or intermittently advanced away from the window to form the three-dimensional object. Concurrently or sequentially with the advancement of the part away from the window, the focal spot is moved in a pattern (e.g., a rasterized pattern), to cure a desired volume of the resin to form the part, again while maintaining the continuous liquid interface of uncured resin in contact with the window and the growing three-dimensional object.

Figure 2:
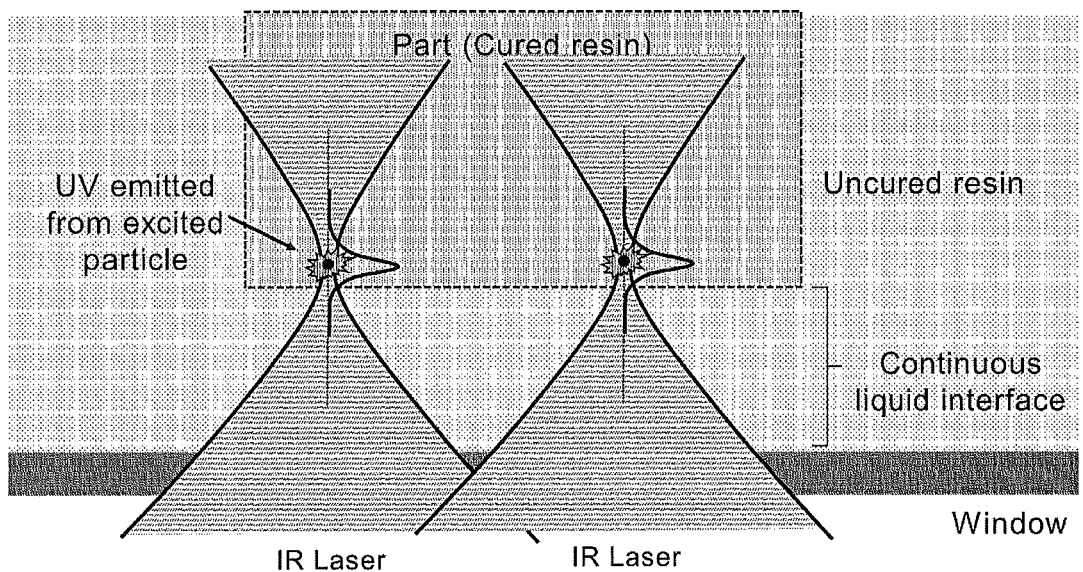
FIG. 2 illustrates a second embodiment of a method of making a three-dimensional object employing upconversion particles to maintain a continuous liquid interface.

The present invention enables a variety of other illumination architectures for the production of three-dimensional objects while maintaining a continuous liquid interface. For example, FIG. 2 presents a means to increase the print speed as compared to FIG. 1 by using multiple spots in parallel. The focal geometry and spacing of the pump beams are chosen to maintain a low actinic intensity in the continuous liquid interface region while having multiple high intensity exposure spots above the window, in like spacing as described in FIG. 1 above.

Figure 3:
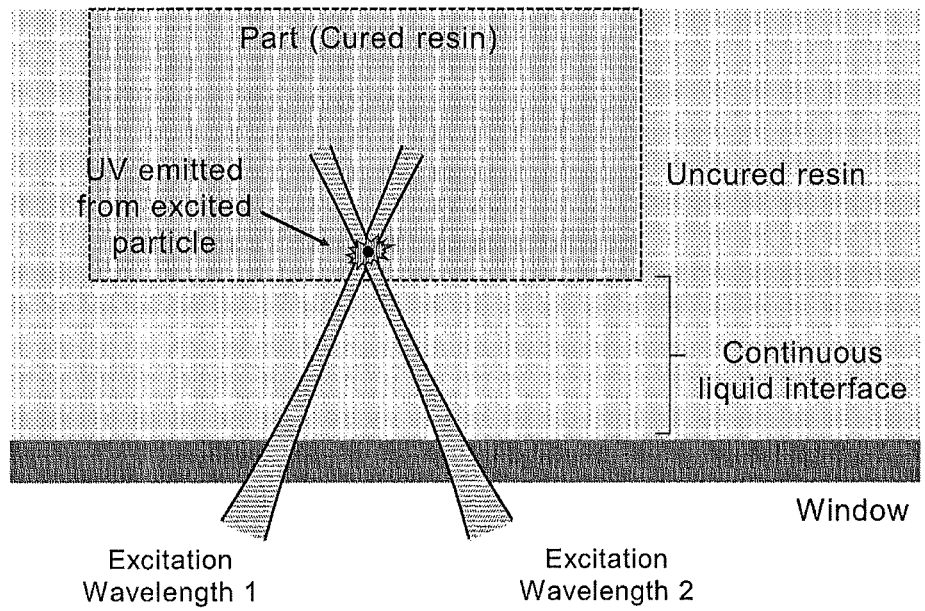
FIG. 3 illustrates a third embodiment of a method of making a three-dimensional object employing upconversion particles, and multiple excitation light sources at different wavelengths.

FIG. 3 schematically illustrates a method using multiple distinct wavelengths to create a liquid interface. In this approach the upconverting particles in the polymerizable liquid, along with the wavelengths and intensities, are selected so that efficient conversion requires the absorption of multiple photons of different and specific wavelengths. Consequently, ultraviolet light generation and cure only occurs in the region of spatial overlap of the beam, and prevents polymerization in the continuous liquid interface. Such an approach can reduce the numerical aperture requirements of the focusing system. The region of spectral overlap can then be scanned to form a cured part. Alternartivly, larger regions and volumes of spectral overlap can simultaneously cure extended regions of resin.

Figure 4:
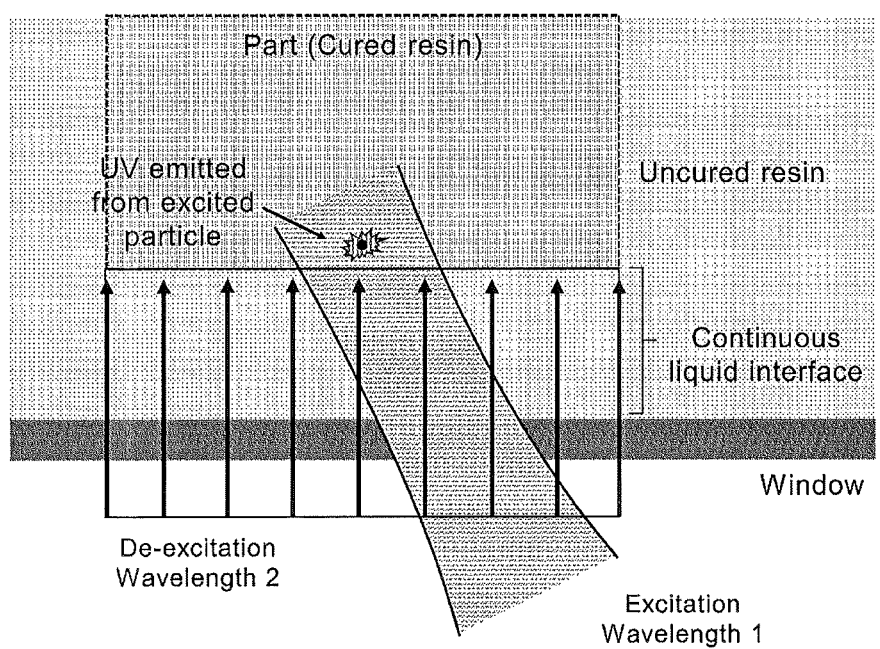
FIG. 4 illustrates a fourth embodiment of a method of making a three-dimensional object employing upconversion particles, with multiple light sources at different wavelengths, where one of the light sources is a depletion or de-excitation light

FIG. 4 illustrates a multiwavelength approach where the infrared light excites the upconversion particles and a second light at a different wavelength (e.g., a depletion light) de-excites the particles in the vicinity of the window to inhibit curing there. The penetration depth and hence the liquid interface thickness can be controlled by the absorption properties of the resin (as discussed above) at the inhibition wavelength. Dual wavelength approaches employing a depletion wavelength are discussed further in connection with FIGS. 5-10 below.

Figure 5:
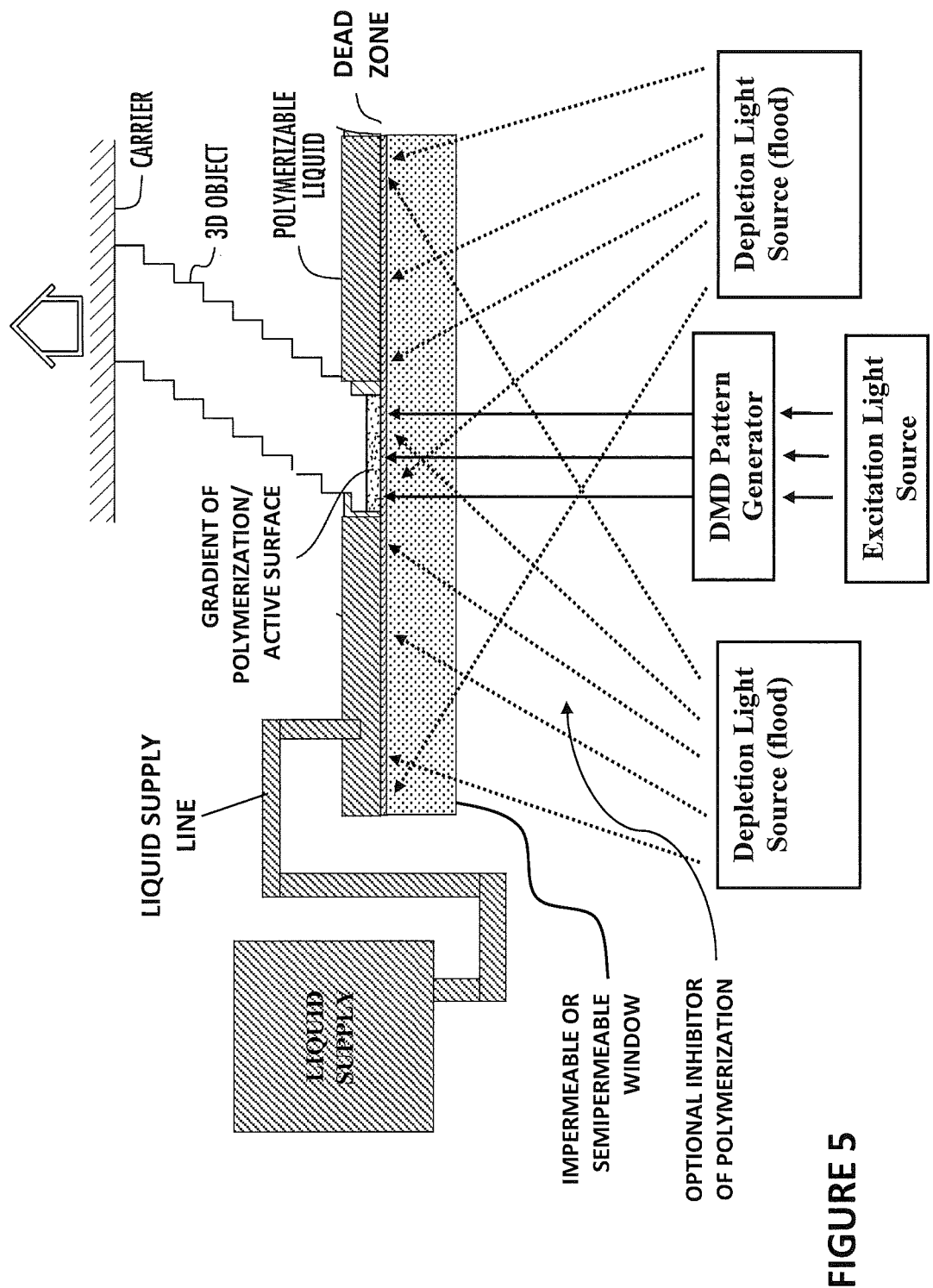
FIG. 5 is a schematic illustration of one set of embodiments of apparatus and methods of the present invention.
Figure 6:
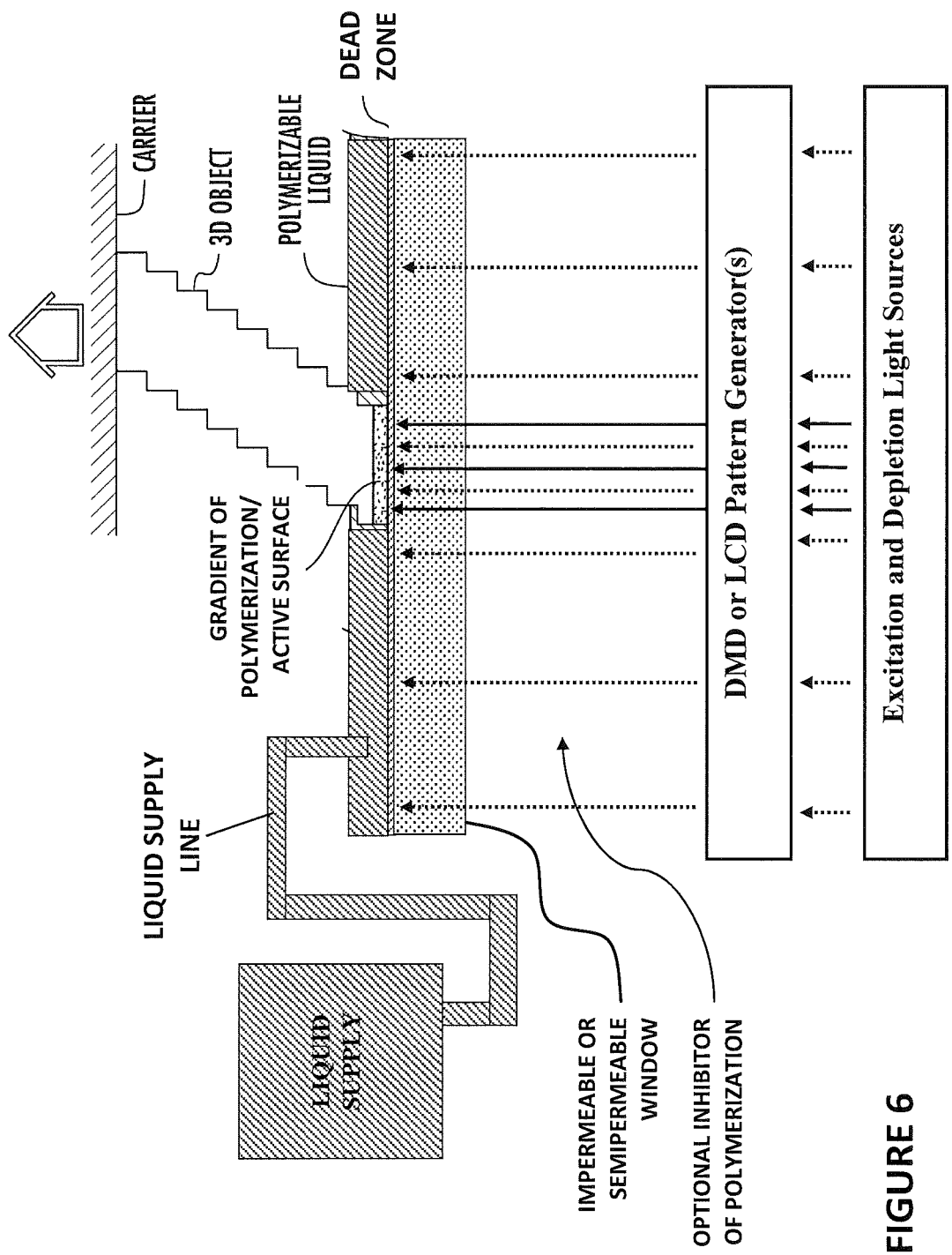
FIG. 6 is a schematic illustration of an addition set of embodiments of apparatus and methods of the present invention.

As schematically illustrated in FIGS. 5-6, an apparatus for forming a three-dimensional object by the methods of the invention may generally include:

(a) a carrier;

(b) an optically transparent member having a build surface, the carrier and the build surface defining a build region therebetween;

(c) a polymerizable liquid supply operatively associated with the build surface;

(d) a first light source operatively associated with the optically transparent member and configured to deliver excitation light to the build region at a first wavelength that polymerizes the polymerizable liquid (e.g., by upconversion to a light at a second wavelength that activates the photoinitiator in the polymerizable liquid), (e) a second light source operatively associated with the optically transparent member and configured to deliver depletion light at a third wavelength, different from the first and second wavelengths, that inhibits the polymerization of the polymerizable liquid; and (f) a pattern generator operatively associated with at least one of the first and third light sources.

In some embodiments, the optically transparent member is impermeable to an inhibitor of polymerization. For example, it may consist or consist essentially of a single unitary sheet of glass, quartz, or sapphire, typically carried by a support frame (aka, a "window frame").

In other embodiments, the optically transparent member may be permeable to an inhibitor of polymerization (such as atmospheric oxygen). In this case, it may comprise a fluoropolymer film or sheet, which contacts the polymerizable liquid, and which has appropriate feed surfaces for feeding the inhibitor therethrough. Where the sheet is flexible, it may be provided with an optically transparent underlying support, and/or tensioned, in accordance with known techniques.

Any suitable light source may be used for either of the two light sources, including LEDs and mercury lamp lights, optionally with appropriate filters. The light sources may be configured in association with a pattern generator, or in the case of a flood light may provide direct illumination to the build region (see FIG. 5).

In some embodiments, the pattern generator comprises a liquid crystal display (LCD). In other embodiments, the pattern generator may be a digital micromirror display (DMD) (also referred to as a digital micromirror array, or DMA).

Polymerizable liquid supply may be provided in any suitable manner, such as by a separate reservoir and associated siphon tube as shown, a simple well over the build surface to contain a pool of polymerizable liquid, pumping and mixing systems, etc., including combinations thereof.

Suitable control may be provided through hardware and/or software, not shown, in accordance with equipment, software, and techniques known in the art, or variations thereof that will be apparent to those skilled in the art.

In use, as noted above, the methods may be carried out by: filling the build region with a polymerizable liquid, and irradiating the build region with light through the optically transparent member; and also advancing the carrier away from the build surface to form a three-dimensional solidified polymer object from the polymerizable liquid.

In the present invention, the irradiating is carried out with both: (i) an excitation light at a first wavelength that polymerizes the polymerizable liquid, and (ii) a depletion light at a second wavelength, different from the first wavelength, that inhibits the polymerization of the polymerizable liquid.

In some embodiments, the excitation light is both spatially and temporally modulated, and the depletion light is: (i) uniform flood exposure over time, (ii) uniform flood exposure modulated in intensity over time; (iii) uniform intensity exposure spatially modulated over time; or (iv) spatially and temporally modulated over time.

In other embodiments, the excitation light is (i) uniform flood exposure over time or (ii) uniform flood exposure modulated in intensity over time, and the depletion light is both spatially and temporally modulated.

Preferably, the depeletion light, alone or in combination with an inhibitor of polymerization, maintains a sustained release layer of non-polymerized polymerizable liquid on the the build surface, contacting the active surface or gradient of polymerization zone of the growing three-dimensional object, during, some of, a major portion of, or all of the time of the fabrication of the growing three-dimensional object being produced. Thus, in some embodiments, the irradiating and/or the advancing steps are carried out while also concurrently: (i) continuously maintaining a dead zone of polymerizable liquid in contact with the build surface, and (ii) continuously maintaining a gradient of polymerization zone or active surface between the dead zone and the solidified polymer and in contact with each thereof, the gradient of polymerization zone or active surface comprising the polymerizable liquid in partially cured form.

Thus, the the dead zone can be maintained by (a) exposure of the polymerizable liquid to the second light, (b) feeding of the inhibitor of polymerization through the optically transparent member, or (c) a combination thereof.

Irradiating with the excitation light can be carried out continuously, intermittently, or a combination thereof.

Similarly, irradiating with the depeletion light may be carried out continuously, intermittently, or a combination thereof.

Advancing of the carrier may be carried out continuously, intermittently (e.g., in step-wise fashion), reciprocally, or as combination thereof (e.g., a continuous phase to produce a relatively small or uniform segment of the three-dimensional object, a reciprocal phase to produce a relatively large or dense segment of the three-dimensional object, etc.).

Additional aspects of the invention are explained in FIGS. 7A-10B. In FIGS. 7A, 8A, 9A, and 10A, vertical stripes identify pixels delivering excitation wavelength exposure; bold diagonal stripes identify pixels delivering high intensity depletion wavelength exposure; and light diagonal stripes identify pixels delivering low intensity depletion wavelength exposure. In FIGS. 7B, 8B, 9B, and 10B, white squares identify regions, corresponding to pixels, in segment of the produced part corresponding to the slice of pixels on the left that are not polymerized, and black squares identify regions that are polymerized.

Figures 7A, 7B:
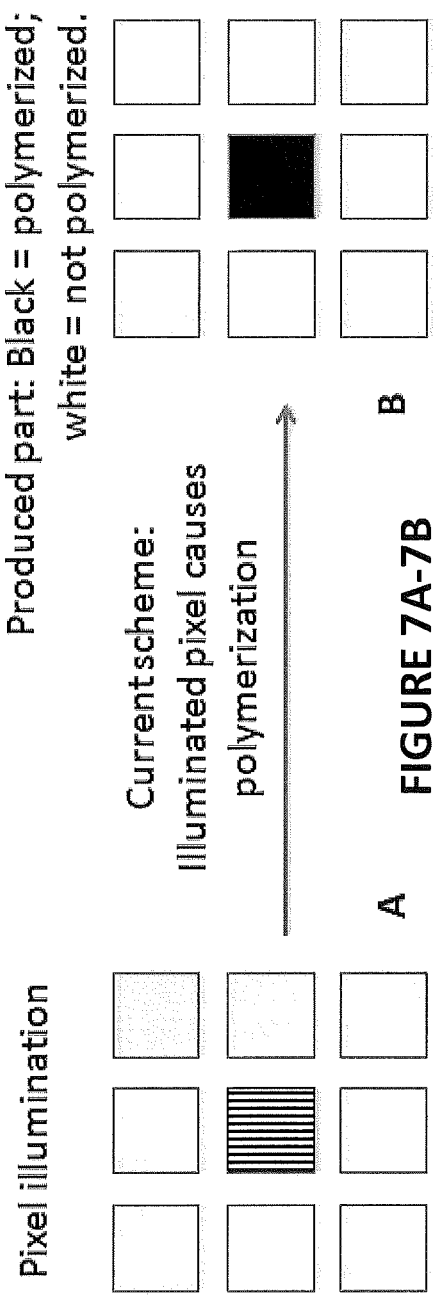
FIGS. 7A-7B schematically illustrates a single wavelength exposure pattern, and corresponding segment of the growing three dimensional object, of prior bottom-up three dimensional fabrication techniques.

FIGS. 7A-7B illustrate currently known exposure techniques, in which a single pixel is illuminated with excitation light, and the corresponding region in the growing three-dimensional object is polymerized.

Figures 8A, 8B:
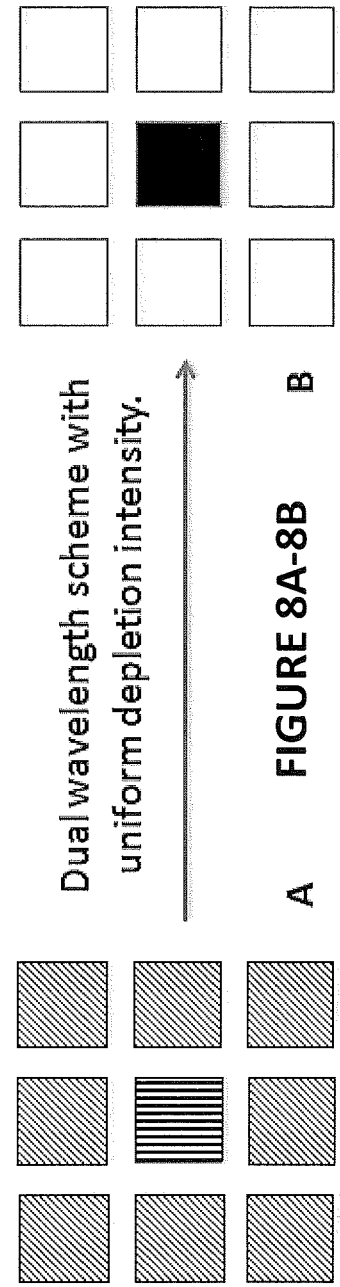

FIGS. 8A-8B schematically illustrates an embodiment of a dual wavelength scheme, in which (i) the depletion intensity is relatively low, and uniform throughout (including under the vertical striped spot representing the center pixel for exposure) to create dead zone. Vertical stripes identify pixels delivering an excitation wavelength exposure, and light diagonal stripes identify pixels delivering a low intensity depletion wavelength exposure. Where, as in FIG. 4b, a pixel receives both exposures, only the excitation exposure is identified by illustration.

Figures 9A, 9B:
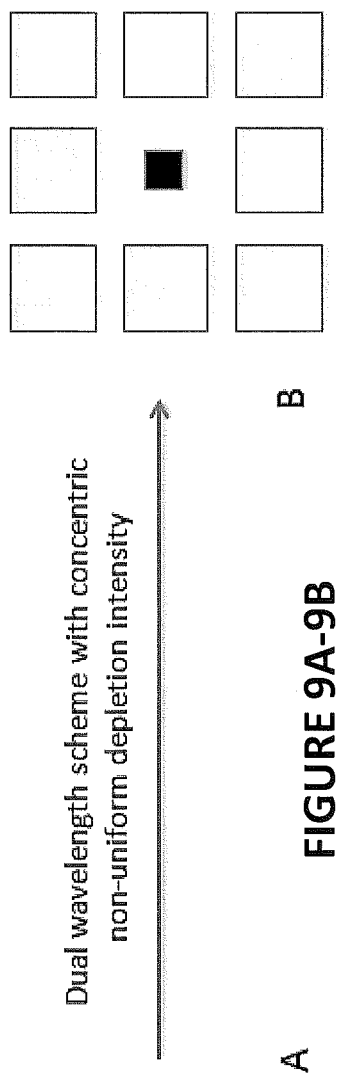

FIGS. 9A-9B schematically illustrate a second embodiment of a dual wavelength scheme, in which, in which (i) the overall depletion intensity is relatively high, but is not uniform (is spatially modulated). Specifically, the center pixel receives low intensity depletion light (not shown), as in FIG. 8A, while the surrounding eight pixels receive higher intensity depletion light. There is some optical overlap between the pixels (e.g., achieved by slight defocusing). The polymerized size of the feature or segment of the object polymerized by the center pixel is smaller, due to the depletion beam spilling over into excitation beam, yet remains centered in the horizontal dimension of the object, relative to the pixels delivering light, because of the equal intensity of the depletion light delivered in the surrounding pixels.

Figures 10A, 10B:
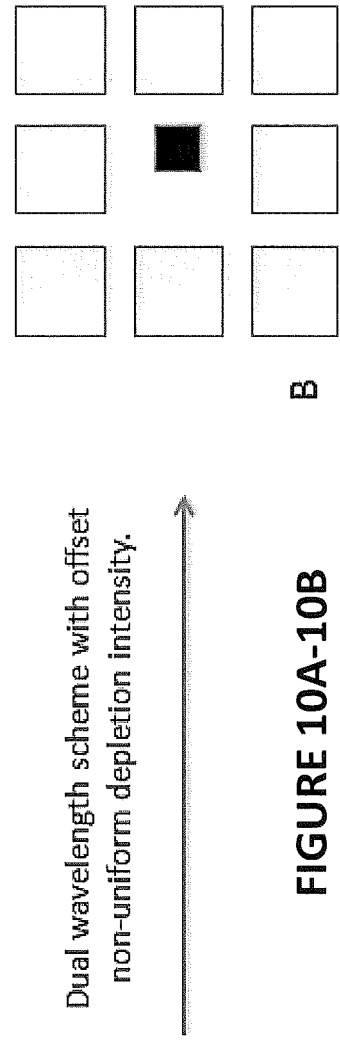

FIGS. 10A-10B schematically illustrate a third embodiment of a dual wavelength scheme, in which (i) the depletion intensity is both high and low (spatially modulated). Specifically, the center pixel, and the pixels on the right, receive low intensity depletion light, while the pixels to the left, and above and below the center pixel, receive higher intensity depletion light. Again there is some optical overlap between the pixels (e.g., achieved by slight defocusing). The polymerized size of the feature or segment of the object polymerized by the center pixel is smaller and shifted to the right, due to the depletion beam spilling over in an unequal or offset manner into the excitation beam.

While the dead zone and the gradient of polymerization zone do not have a strict boundary therebetween (in those locations where the two meet), the thickness of the gradient of polymerization zone is in some embodiments at least as great as the thickness of the dead zone. Thus, in some embodiments, the dead zone has a thickness of from 0.01, 0.1, 1, 2, or 10 microns up to 100, 200 or 400 microns, or more, and/or the gradient of polymerization zone and the dead zone together have a thickness of from 1 or 2 microns up to 400, 600, or 1000 microns, or more. Thus the gradient of polymerization zone may be thick or thin depending on the particular process conditions at that time. Where the gradient of polymerization zone is thin, it may also be described as an active surface on the bottom of the growing three-dimensional object, with which monomers can react and continue to form growing polymer chains therewith. In some embodiments, the gradient of polymerization zone, or active surface, is maintained (while polymerizing steps continue) for a time of at least 5, 10, 15, 20 or 30 seconds, up to 5, 10, 15 or 20 minutes or more, or until completion of the three-dimensional product.

The method may further comprise the step of disrupting the gradient of polymerization zone for a time sufficient to form a cleavage line in the three-dimensional object (e.g., at a predetermined desired location for intentional cleavage, or at a location in the object where prevention of cleavage or reduction of cleavage is non-critical), and then reinstating the gradient of polymerization zone (e.g. by pausing, and resuming, the advancing step, increasing, then decreasing, the intensity of irradiation, and combinations thereof).

In some embodiments, the advancing step is carried out sequentially in uniform increments (e.g., of from 0.1 or 1 microns, up to 10 or 100 microns, or more) for each step or increment. In some embodiments, the advancing step is carried out sequentially in variable increments (e.g., each increment ranging from 0.1 or 1 microns, up to 10 or 100 microns, or more) for each step or increment. The size of the increment, along with the rate of advancing, will depend in part upon factors such as temperature, pressure, structure of the article being produced (e.g., size, density, complexity, configuration, etc.)

In other embodiments of the invention, the advancing step is carried out continuously, at a uniform or variable rate.

In some embodiments, the rate of advance (whether carried out sequentially or continuously) is from about 0.1 1, or 10 microns per second, up to about to 100, 1,000, or 10,000 microns per second, again depending again depending on factors such as temperature, pressure, structure of the article being produced, intensity of radiation, etc.

When the patterned irradiation is a variable pattern rather than a pattern that is held constant over time, then each irradiating step may be any suitable time or duration depending on factors such as the intensity of the irradiation, the presence or absence of dyes in the polymerizable material, the rate of growth, etc. Thus in some embodiments each irradiating step can be from 0.001, 0.01, 0.1, 1 or 10 microseconds, up to 1, 10, or 100 minutes, or more, in duration. The interval between each irradiating step is in some embodiments preferably as brief as possible, e.g., from 0.001, 0.01, 0.1, or 1 microseconds up to 0.1, 1, or 10 seconds. In example embodiments, the pattern may vary hundreds, thousands or millions of times to impart shape changes on the three-dimensional object being formed. In addition, in example embodiments, the pattern generator may have high resolution with millions of pixel elements that can be varied to change the shape that is imparted. For example, the pattern generator may be a DLP with more than 1,000 or 2,000 or 3,000 or more rows and/or more than 1,000 or 2,000 or 3,000 or more columns of micromirrors, or pixels in a liquid crystal display panel, that can be used to vary the shape. In example embodiments, the three-dimensional object may be formed through the gradient of polymerization allowing the shape changes to be imparted while continuously printing. In example embodiments, this allows complex three-dimensional objects to be formed at high speed with a substantially continuous surface without cleavage lines or seams. In some examples, thousands or millions of shape variations may be imparted on the three-dimensional object being formed without cleavage lines or seams across a length of the object being formed of more than 1 mm, 1 cm, 10 cm or more or across the entire length of the formed object. In example embodiments, the object may be continuously formed through the gradient of polymerization at a rate of more than 1, 10, 100, 1000, 10000 or more microns per second.

While the present invention has been describe above in connection with more conventional stereolithography (e.g., "bottom-up" or "top-down") projection systems, in which the growing object is moved (typically in the "Z" or vertical dimension) as it is being produced to provide space for additional resin to flow into for subsequent polymerization, it will be appreciated that this invention can also be implemented by techniques in which a three-dimensional or "holographic" image is projected into a large resin pool, by techniques such as described in Chiabrera et al., U.S. Pat. Nos. 6,259,450 and 6,304,263 (Hyper3d Corp), and by Smoot et al., US Patent Application Pub. No. US 2016/0107380 (Disney Enterprises), the disclosures of which are incorporated herein by reference. In cases such as these, movement of a carrier during production of the three dimensional object may not be required (or, rotation of the carrier or support may be utilized).

III. Objects Produced.

The above methods, structures, materials, compositions and properties may be used to produce a virtually unlimited number of products. Examples include, but are not limited to, medical devices and implantable medical devices such as stents, drug delivery depots, catheters, bladder, breast implants, testicle implants, pectoral implants, eye implants, contact lenses, dental aligners, microfluidics, seals, shrouds, and other applications requiring high biocompatibility, functional structures, microneedle arrays, fibers, rods, waveguides, micromechanical devices, microfluidic devices; fasteners; electronic device housings; gears, propellers, and impellers; wheels, mechanical device housings; tools; structural elements; hinges including living hinges; boat and watercraft hulls and decks; wheels; bottles, jars and other containers; pipes, liquid tubes and connectors; foot-ware soles, heels, innersoles and midsoles; bushings, o-rings and gaskets; shock absorbers, funnel/hose assembly, cushions; electronic device housings; shin guards, athletic cups, knee pads, elbow pads, foam liners, padding or inserts, helmets, helmet straps, head gear, shoe cleats, gloves, other wearable or athletic equipment, brushes, combs, rings, jewelry, buttons, snaps, fasteners, watch bands or watch housings, mobile phone or tablet casings or housings, computer keyboards or keyboard buttons or components, remote control buttons or components, auto dashboard components, buttons, dials, auto body parts, paneling, other automotive, aircraft or boat parts, cookware, bakeware, kitchen utensils, steamers and any number of other 3D objects. The universe of useful 3D products that may be formed is greatly expanded by the ability to impart a wide range of shapes and properties, including elastomeric properties, through the use of multiple methods of hardening such as dual cure where a shape can be locked-in using continuous liquid interphase printing and subsequent thermal or other curing can be used to provide elastomeric or other desired properties. Any of the above described structures, materials and properties can be combined to form 3D objects including the 3D formed products described above. These are examples only and any number of other 3D objects can be formed using the methods and materials described herein.

Multi-colored objects from viscous polymerizable liquids. In some embodiments, the polymerizable liquid has a viscosity of 1,000 centipoise, 2,000 centipoise, or 4,000 centipoise, or more, under conditions in which the methods are carried out. This can facilitate the pool of polymerizable liquid from which the object is produced being formed of (regular or irregularly shaped) two or more distinct regions of polymerizable liquids, which are chemically compatiable (e.g., polymerizable) with one another, but differ from one another in the colorant included therein. For example, one portion of the pool may be green, and another portion of the pool may be red, etc. The relatively high viscosity of the polymerizable liquid in each region reduces the bleeding of one segment of the pool into the other, and facilitates the production of multi-colored three dimensional objects.

The foregoing is illustrative of the present invention, and is not to be construed as limiting thereof. The invention is defined by the following claims, with equivalents of the claims to be included therein.

We claim:

1. A method of forming a three-dimensional object, comprising:
   (a) providing a carrier and an optically transparent member having a build surface, said carrier and said build surface defining a build region therebetween;
   (b) filling said build region with a polymerizable liquid, said polymerizable liquid comprising:
      (i) a polymerizable component;
      (ii) upconverting particles dispersed in the polymerizable liquid that are excited by light at a first wavelength and upon excitation emit light at a second wavelength that is shorter than said first wavelength; and
      (iii) a photoinitiator that catalyzes polymerization of said polymerizable component upon excitation by light at said second wavelength; and
   (c) irradiating said build region through said optically transparent member with an excitation light at said first wavelength, wherein said excitation light is temporally and/or spatially modulated, to thereby form said three-dimensional object from said polymerizable liquid.

2. The method of claim 1, wherein said optically transparent member is impermeable to an inhibitor of polymerization.

3. The method of claim 1, wherein said optically transparent member is permeable to an inhibitor of polymerization, and said method further comprises feeding an inhibitor of polymerization through said optically transparent member.

4. The method of claim 1, further comprising:
   advancing said carrier with a polymerized region adhered thereto away from said build surface on said build plate to create a subsequent build region between said polymerized region and said build surface while concurrently filling said subsequent build region with polymerizable liquid as in step (b), wherein said irradiating and/or said advancing steps are carried out while also concurrently:
   (i) continuously maintaining a dead zone of polymerizable liquid in contact with said build surface, and
   (ii) continuously maintaining a gradient of polymerization zone or active surface between said dead zone and said solidified polymer and in contact with each thereof, said gradient of polymerization zone or active surface comprising said polymerizable liquid in partially cured form.

5. The method of claim 4, wherein said dead zone is maintained by (a) focus of said excitation in said polymerizable liquid above said dead zone, (b) feeding of an inhibitor of polymerization through said optically transparent member, or (c) a combination thereof.

6. The method of claim 1, wherein said irradiating with an excitation light is carried out continuously, intermittently, or a combination thereof.

7. The method of claim 1, further comprising:
   advancing said carrier with a polymerized region adhered thereto away from said build surface on said build plate to create a subsequent build region between said polymerized region and said build surface while concurrently filling said subsequent build region with polymerizable liquid as in step (b), wherein said advancing is carried out continuously, intermittently, reciprocally, or a combination thereof.

8. The method of claim 1, wherein said spatially modulated is created by a liquid crystal display (LCD) or a digital micromirror display (DMD).

9. The method of claim 1, wherein said first wavelength is in the infrared or near-infrared range, and said second wavelength is in the ultraviolet range.

10. The method of claim 1, wherein said first wavelength is in the range of 400 nm to 1200 nm.

11. The method of claim 1, wherein said second wavelength is in the range of 200 to 500 nm.

12. The method of claim 1, wherein said polymerizable liquid has an extinction coefficient at said first wavelength of 0.01 um$^{-1}$ or less.

13. The method of claim 1, wherein said polymerizable liquid has a total extinction at the second wavelength of (i) not more than 0.1 um$^{-1}$, or (ii) at least 0.1 um$^{-1}$.

14. The method of claim 1, wherein said polymerizable liquid has a viscosity of 1,000 centipoise or more, under conditions in which said method is carried out.

15. A method of forming a three-dimensional object, comprising:
   (a) providing a carrier and an optically transparent member having a build surface, said carrier and said build surface defining a build region therebetween;
   (b) filling said build region with a polymerizable liquid, said polymerizable liquid comprising:
      (i) a polymerizable component;
      (ii) upconverting particles dispersed in the polymerizable liquid that are excited by light at a first wavelength and upon excitation emit light at a second wavelength that is shorter than said first wavelength; and
      (iii) a photoiniator that catalyzes polymerization of said polymerizable component upon excitation by light at said second wavelength; and
   (c) irradiating said build region with light through said optically transparent member,
   wherein said irradiating is carried out with both: (i) an excitation light at said first wavelength, and (ii) a depletion light at a third wavelength, different from said first and second wavelengths, that inhibits the excitation of said upconverting particles;
   and wherein at least one of said excitation and depletion lights is temporally and/or spatially modulated to thereby form said three-dimensional object.

16. The method of claim 15, wherein:
   said excitation light is both spatially and temporally modulated, and
   said depletion light is: (i) uniform flood exposure over time, (ii) uniform flood exposure modulated in intensity over time; (iii) uniform intensity exposure spatially modulated over time; or (iv) spatially and temporally modulated over time.

17. The method of claim 15, wherein:
   said excitation light is (i) uniform flood exposure over time or (ii) uniform flood exposure modulated in intensity over time, and
   said depletion light is both spatially and temporally modulated.

18. The method of claim 15, wherein said optically transparent member is impermeable to an inhibitor of polymerization.

19. The method of claim 15, wherein said optically transparent member is permeable to an inhibitor of polymerization, and said method further comprises feeding an inhibitor of polymerization through said optically transparent member.

20. The method of claim 15, further comprising:
   advancing said carrier with a polymerized region adhered thereto away from said build surface on said build plate to create a subsequent build region between said polymerized region and said build surface while concurrently filling said subsequent build region with polymerizable liquid as in step (b), wherein said irradiating and/or said advancing steps are carried out while also concurrently:
      (i) continuously maintaining a dead zone of polymerizable liquid in contact with said build surface, and
      (ii) continuously maintaining a gradient of polymerization zone or active surface between said dead zone and said solidified polymer and in contact with each thereof, said gradient of polymerization zone or active surface comprising said polymerizable liquid in partially cured form.

21. The method of claim 20, wherein said dead zone is maintained by (a) exposure of said polymerizable liquid to said second light, (b) feeding of an inhibitor of polymerization through said optically transparent member, or (c) a combination thereof.

22. The method of claim 15, wherein said irradiating with an excitation light is carried out continuously, intermittently, or a combination thereof.

23. The method of claim 15, wherein said irradiating with a depletion light is carried out continuously, intermittently, or a combination thereof.

24. The method of claim 15, further comprising:
   advancing said carrier with a polymerized region adhered thereto away from said build surface on said build plate to create a subsequent build region between said polymerized region and said build surface while concurrently filling said subsequent build region with polymerizable liquid as in step (b), wherein said advancing is carried out continuously, intermittently, reciprocally, or a combination thereof.

25. The method of claim 15, wherein irradiating said build region with light through said optically transparent member comprises patterned exposure that is created by a liquid crystal display (LCD).

26. The method of claim 15, wherein irradiating said build region with light through said optically transparent member comprises patterned exposure that is created by a digital micromirror display (DMD).

27. The method of claim 15, wherein said first wavelength is in the infrared or near-infrared range, and said second wavelength is in the ultraviolet range.

28. The method of claim 15, wherein said first wavelength is in the range of 400 nm to 1200 nm.

29. The method of claim 15, wherein said second wavelength is in the range of 200 nm to 500 nm.

30. The method of claim 15, wherein said third wavelength is in the range of 400 nm to 1600 nm.

31. The method of claim 15, wherein:
   (i) said first wavelength in the range of 800 to 1000 nm, said second wavelength in the range of 300 to 400 nm, and said third wavelength is in the range of 400 to 800 nm;
   (ii) said first wavelength in the range of 800 to 1000 nm, said second wavelength in the range of 300 to 400 nm, and said third wavelength is in the range of 1100 to 1600 nm;
   (iii) said first wavelength in the range of 900 to 1000 nm, said second wavelength in the range of 300 to 400 nm, and said third wavelength is in the range of 400 to 900 nm;
   (iv) said first wavelength in the range of 800 to 1000 nm, said second wavelength in the range of 250 to 300 nm, and said third wavelength is in the range of 400 to 800 nm; or (v) said first wavelength in the range of 800 to 1000 nm, said second wavelength in the range of 250 to 475 nm, and said third wavelength is in the range of 475 to 800 nm.

32. The method of claim 15, wherein said polymerizable liquid has an extinction coefficient at said first wavelength of $0.01\ \mathrm{um}^{-1}$ or less.

33. The method of claim 15, wherein said polymerizable liquid has a total extinction at the second wavelength of (i) not more than $0.1\ \mathrm{um}^{-1}$, or (ii) at least $0.1\ \mathrm{um}^{-1}$.

34. The method of claim 15, wherein said polymerizable liquid has a viscosity of 1,000 centipoise or more, under conditions in which said method is carried out.

\* \* \* \* \*